(12) United States Patent
Pelletier et al.

(10) Patent No.: US 8,986,841 B2
(45) Date of Patent: Mar. 24, 2015

(54) REINFORCED GLASS-CERAMIC ARTICLE AND ENAMEL SUITABLE FOR THE COATING THEREOF

(71) Applicants: Stephanie Pelletier, Paris (FR); Marie-Helene Chopinet, Paris (FR); Caroline Faillat, Belleau (FR); Marie-Helene Rouillon, Chateau-Thierry (FR); Pablo Vilato, Paris (FR)

(72) Inventors: Stephanie Pelletier, Paris (FR); Marie-Helene Chopinet, Paris (FR); Caroline Faillat, Belleau (FR); Marie-Helene Rouillon, Chateau-Thierry (FR); Pablo Vilato, Paris (FR)

(73) Assignee: Eurokera S.N.C., Chateau-Thierry (FR)

( * ) Notice: Subject to any disclaimer, the term of this patent is extended or adjusted under 35 U.S.C. 154(b) by 0 days.

(21) Appl. No.: 14/152,230

(22) Filed: Jan. 10, 2014

(65) Prior Publication Data

US 2014/0193627 A1 Jul. 10, 2014

Related U.S. Application Data

(62) Division of application No. 12/812,047, filed as application No. PCT/FR2009/050063 on Jan. 16, 2009, now Pat. No. 8,673,461.

(30) Foreign Application Priority Data

Jan. 18, 2008 (FR) ..................... 08 50313

(51) Int. Cl.
| B32B 17/06 | (2006.01) |
| C03B 32/02 | (2006.01) |
| C03C 8/00 | (2006.01) |
| C03C 17/02 | (2006.01) |
| C03C 8/04 | (2006.01) |
| C03C 3/085 | (2006.01) |
| C03C 8/02 | (2006.01) |
| C03C 17/04 | (2006.01) |

(52) U.S. Cl.
CPC . *C03C 8/04* (2013.01); *C03C 3/085* (2013.01); *C03C 8/02* (2013.01); *C03C 17/04* (2013.01)
USPC .......... 428/410; 428/426; 428/428; 428/688; 428/689; 428/697; 428/702; 501/21; 501/26; 427/402; 427/419.1; 427/419.2; 427/419.6; 427/331; 427/372.2; 427/375; 427/376.1; 427/376.2; 65/33.1; 65/33.2; 65/33.4; 65/33.5

(58) Field of Classification Search
USPC ......... 428/410, 426, 428, 432, 688, 689, 697, 428/699, 701, 702; 501/21, 26; 427/402, 427/419.1, 419.2, 419.6, 331, 372.2, 375, 427/376.1, 376.2; 65/33.1, 33.2, 33.4, 33.5
See application file for complete search history.

(56) References Cited

U.S. PATENT DOCUMENTS

| | | | | |
|---|---|---|---|---|
| 3,287,200 A * | 11/1966 | Hess et al. | ..................... | 428/410 |
| 3,637,453 A * | 1/1972 | Simmons | ........................ | 428/410 |
| 3,673,049 A * | 6/1972 | Giffen et al. | .................. | 428/213 |
| 3,840,394 A | 10/1974 | Eppler | | |
| 3,849,097 A * | 11/1974 | Giffen et al. | ................... | 65/33.5 |
| 3,854,919 A * | 12/1974 | Pirooz | ............................ | 65/32.3 |
| 4,074,993 A * | 2/1978 | Ackerman et al. | ........... | 65/30.14 |
| 4,507,392 A * | 3/1985 | Rittler | ............... | 501/4 |
| 5,691,254 A * | 11/1997 | Sakamoto et al. | ............. | 501/17 |
| 5,866,239 A * | 2/1999 | Shimatani et al. | ............ | 428/210 |
| 6,043,171 A * | 3/2000 | Siebers et al. | .................. | 501/66 |
| 6,517,943 B1 * | 2/2003 | Beunet et al. | ................... | 428/428 |
| 6,525,300 B1 * | 2/2003 | Mitra et al. | ................ | 219/443.1 |
| 6,911,408 B2 * | 6/2005 | Beunet et al. | .................... | 501/26 |
| 7,393,801 B2 * | 7/2008 | Beunet et al. | .................... | 501/69 |
| 7,671,303 B2 * | 3/2010 | Vilato et al. | ............... | 219/443.1 |
| 7,981,823 B2 * | 7/2011 | Siebers et al. | .................... | 501/7 |
| 2003/0148868 A1 * | 8/2003 | Beunet et al. | ................... | 501/17 |
| 2005/0090376 A1 * | 4/2005 | Beunet et al. | ................... | 501/69 |
| 2005/0224491 A1 * | 10/2005 | Vilato et al. | ............... | 219/443.1 |
| 2005/0250639 A1 * | 11/2005 | Siebers et al. | ................. | 501/68 |
| 2007/0003769 A1 * | 1/2007 | Striegler | ..................... | 428/426 |

| | | | |
|---|---|---|---|
| 2008/0190409 | A1* | 8/2008 | Demol et al. ............... 126/211 |
| 2009/0321426 | A1* | 12/2009 | Vilato et al. ............... 219/649 |
| 2010/0273631 | A1* | 10/2010 | Pelletier et al. ............... 501/26 |
| 2012/0108414 | A1* | 5/2012 | Ruedinger et al. ............... 501/32 |
| 2012/0263957 | A1* | 10/2012 | Chopinet et al. ............... 428/428 |
| 2013/0164509 | A1* | 6/2013 | Siebers et al. ............... 428/210 |
| 2014/0057092 | A1* | 2/2014 | Beall et al. ............... 428/220 |
| 2014/0066285 | A1* | 3/2014 | Beall et al. ............... 501/32 |
| 2014/0134397 | A1* | 5/2014 | Amin et al. ............... 428/141 |

FOREIGN PATENT DOCUMENTS

| | | |
|---|---|---|
| EP | 0 794 158 | 9/1997 |
| EP | 1 275 620 | 1/2003 |
| FR | 2 732 960 | 10/1996 |
| WO | 03 084891 | 10/2003 |

OTHER PUBLICATIONS

International Search Report issued Apr. 8, 2010 in PCT/FR09/50063 filed Jan. 16, 2009.

\* cited by examiner

*Primary Examiner* — David Sample
*Assistant Examiner* — Lauren Colgan
(74) *Attorney, Agent, or Firm* — Oblon, McClelland, Maier & Neustadt, L.L.P.

(57) ABSTRACT

A process for reinforcing a glass-ceramic article, into which a maximum tension is introduced beneath the surface of the glass-ceramic, advantageously in proximity to said surface. The invention also relates to an enamel that can be used for this reinforcement, this enamel being formed from a glass frit having the following composition, the proportions being expressed as weight percentages:

| | |
|---|---|
| $SiO_2$ | 50-66% |
| $MgO$ | 3-8% |
| $Na_2O$ | 7-15% |
| $K_2O$ | 0-3% |
| $Li_2O$ | 0-12% |
| $CaO$ | 0-10% |
| $BaO$ | 0-15% |
| $Al_2O_3$ | 0-3% |
| $ZrO_2$ | 0-3% |
| $ZnO$ | 0-5% |
| $B_2O_3$ | 0-8% | the sum of the alkaline-earth metal oxides CaO+BaO moreover being between 8 and 15%, and the sum of the alkali metal oxides $Na_2O+K_2O+Li_2O$ moreover being between 7 and 20%. The reinforced glass-ceramics obtained by the process.

15 Claims, 3 Drawing Sheets

REINFORCED GLASS-CERAMIC ARTICLE AND ENAMEL SUITABLE FOR THE COATING THEREOF

CROSS-REFERENCE TO RELATED APPLICATIONS

The present application is a divisional application of U.S. patent application Ser. No. 12/812,047, filed on Jul. 8, 20110, which is a 35 U.S.C. §371 national stage patent application of international patent application PCT/FR09/050063, filed on Jan. 16, 2009, which claims priority to French application no. 0850313, filed on Jan. 18, 2008, the entire contents of which are herein incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF THE MATERIAL ON THE COMPACT DISC

Not Applicable.

BACKGROUND OF THE INVENTION

1. Field of the Invention

The present invention relates to an article (substrate, product) made of glass-ceramic, in particular a glass-ceramic plate, intended, for example, for covering or accommodating heating elements, such as for example a hob, an oven door, or a chimney insert, or a fire screen, etc., to a process for obtaining said article, and to a novel enamel composition suitable for the coating thereof. More particularly, the present invention relates to a mechanically reinforced glass-ceramic article and also to the process of reinforcing a glass-ceramic article and/or to the enamel that makes it possible to obtain said reinforced glass-ceramic article.

Sales of articles such as glass-ceramic hobs have been continuing to grow over the last few years. This success is explained in particular by the attractive appearance of such hobs and by the ease of cleaning them.

It will be recalled that a glass-ceramic is originally a glass, called precursor glass (or mother glass. or green glass), the specific chemical composition of which allows controlled crystallization to be induced by suitable heat treatments, called ceramization. This partly crystallized specific structure gives the glass-ceramic unique properties.

2. Description of the Related Art Including Information Disclosed Under 37 CFR 1.97 and 1.98

At the present time, there are various types of glass-ceramic plate, each variant being the result of extensive research and many tests, given that it is very difficult to make modifications to these plates and/or to the process for obtaining them without risking an unfavorable effect on the desired properties. In particular, to be able to be used as a hob, a glass-ceramic plate must generally have a transmission in the wavelengths of the visible range that is both low enough to mask at least some of the subjacent heating elements when not in use and high enough so that, depending on the case (radiant heating, induction heating, etc.), the user can, for the sake of safety, visually detect the heating elements when they are in operation and/or can, where appropriate, read the displays. It must also have a high transmission in the wavelengths of the infrared range, especially in the case of hobs with radiant burners.

The glass-ceramic plates must also have a sufficient mechanical strength as demanded in their field of use (for example, in accordance with the EN 60335-2-6 standard for hobs in the field of household electrical goods). In particular, in order to be able to be used as hobs, the glass-ceramic plates must have sufficient resistance to the pressure and to the shocks that may arise (support and dropping of utensils, etc.). Generally, the glass-ceramic plates alone have a mechanical strength that is expressed in particular by a scale factor (defined below) between 150 and 180 MPa.

Most current plates are of dark color, in particular black, but there are also plates of lighter color (in particular white having, for example, a haze of at least 50%, as described in patent FR 2 766 816), or even transparent plates provided with opacifying coatings. Among known (functional and/or decorative) coatings for glass-ceramic plates, there are conventionally enamels, based on glass frits and pigments, and certain paints resistant to high temperature, based for example on alkyd resins. In particular, enamels have the advantage of being able to be deposited on the precursor glass (or mother glass or green glass) before ceramization and of being able to be baked during the ceramization, and also have the advantage of being able to withstand high temperatures (allowing the use of various heating means for the plate). However, they have the drawback of generally permitting only a single deposition (no enamel superposition is possible) and with a small thickness, otherwise there is a risk in particular of the enamel flaking off and of mechanically damaging the glass-ceramic plate. As regards paint, this may be applied (if so required) as several layers. However, it must be applied after ceramization (and therefore requires an additional baking operation) and remains limited to plates for induction burners (operating at lower temperature).

More recently, glass-ceramic plates have also been proposed with coatings based on reflective layers deposited by magnetron sputtering or based on glass batch materials incorporating special-effect pigments (aluminum oxide or mica flakes coated with metal oxides). However, the coatings based on layers deposited by magnetron sputtering are more expensive since they require a specific installation and are generally limited to plates for induction burners, and their manufacture, carried out after ceramization, is more complex or tricky. As regards coatings based on a glass batch with special effect pigments, they have the same drawbacks as the abovementioned enamels.

BRIEF SUMMARY OF THE INVENTION

The object of the present invention was to provide improved novel glass-ceramic articles (such as plates), in particular to develop an enamel composition more suitable for the coating of glass-ceramics, this composition not having, or having in a significantly more limited fashion, the drawbacks of enamel compositions currently used for glass-ceramics, in particular to embrittle the glass-ceramic as little as possible, while retaining the advantages linked to the use of an enamel, and also, where appropriate, a sufficient opacity. By so doing, the present invention is not only oriented toward the development of unembrittled glass-ceramic articles, but has moreover enabled the production of reinforced glass-ceramic articles through the development of a process that aims to improve the mechanical strength of the glass-ceramic articles.

DETAILED DESCRIPTION OF THE INVENTION

Figure 1:
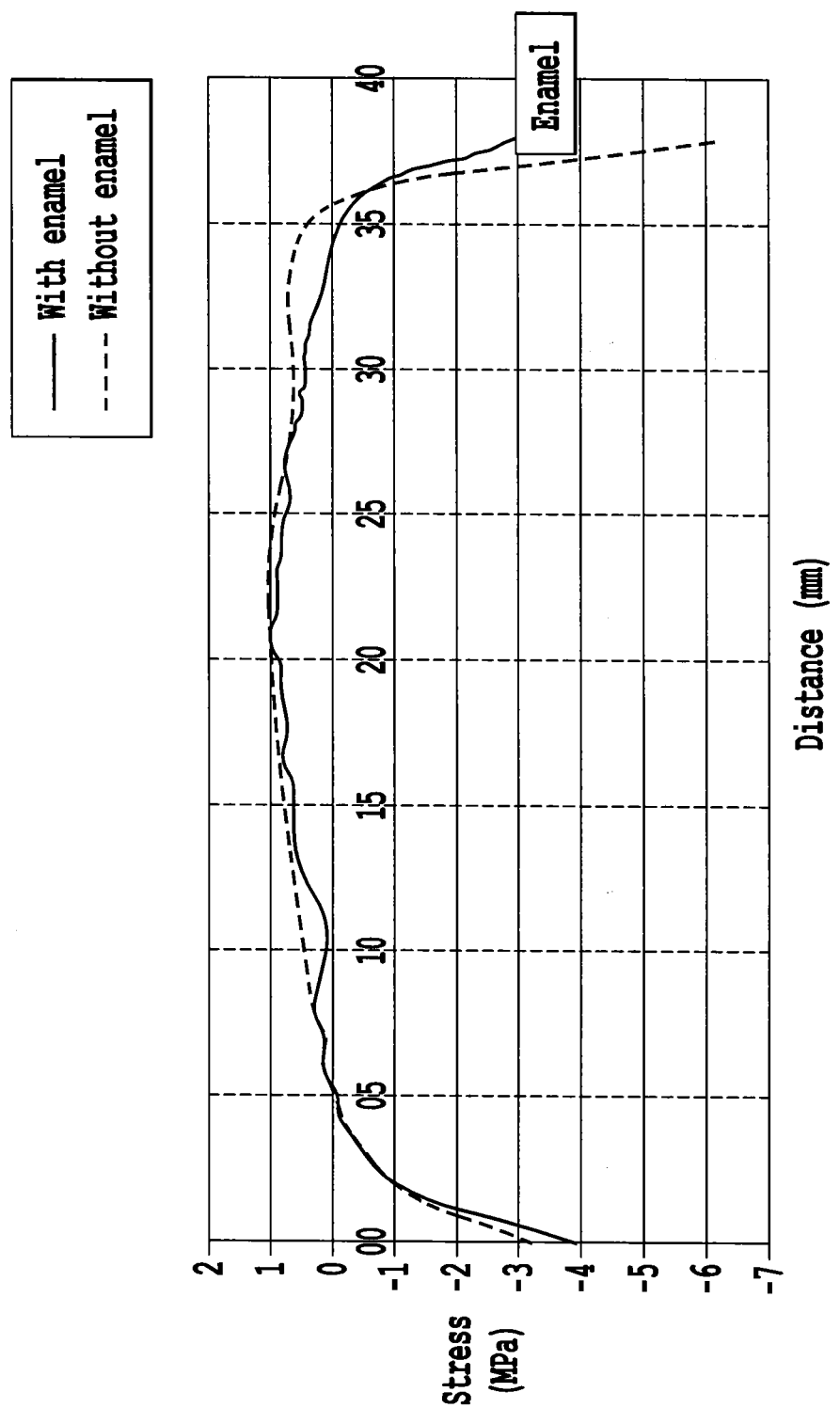
FIG. 1: The thickness stress profile in the glass-ceramic of reference example 3, which includes the case of the bare (uncoated) glass-ceramic plates.

The present invention thus relates to a novel glass-ceramic article (or substrate), such as a plate, and a novel enamel for glass-ceramics, said article being at least partly coated with at least one layer of said enamel, this enamel comprising one (or being formed of one or from one) glass frit having the following (weight) composition, the proportions being expressed as weight percentages (composition expressed as weight percentages of oxides or else percentages by weight, based on the oxides, the constituents commonly being in this form in the enamel compositions):

| | |
|---|---|
| $SiO_2$ | 50-66% and preferably 50-65% |
| MgO | 3-8% and preferably 4-8% |
| $Na_2O$ | 7-15% |
| $K_2O$ | 0-3% |
| $Li_2O$ | 0-12% |
| CaO | 0-10% |
| BaO | 0-15% and preferably 0-13% |
| $Al_2O_3$ | 0-3% and preferably 0-2% |
| $ZrO_2$ | 0-3% and preferably 0-2% |
| ZnO | 0-5% |
| $B_2O_3$ | 0-8% and preferably 0-7% | the sum of the alkaline-earth metal oxides CaO+BaO moreover being between 8 and 15%, and preferably between 8 and 12%, and the sum of the alkali metal oxides $Na_2O$+$K_2O$+$Li_2O$ moreover being between 7 and 20%, in particular between 7 and 15%.

Preferably, the glass-ceramic article according to the invention is a glass-ceramic plate, intended, for example, for covering or accommodating at least one heating element, in particular intended to be used as a hob or as a wall (in particular a door or part of a door) of an oven, or as a chimney insert, or else as a fire screen.

The present invention relates simultaneously to the (mineral) glass having the composition defined above, used for the frit and that makes it possible to produce the improved enamel and article according to the invention, the enamel thus produced, having a composition that (initially) contains the particles (or frit) of said glass, and also in its form obtained by baking said composition, and the glass-ceramic article coated (usually over part or all of one face) with said enamel.

The present invention also relates to a process for manufacturing an article, in particular a plate according to the invention, in which the above composition is applied, preferably by screen printing, to the precursor glass (or mother glass or green glass) article before ceramization, said composition being baked during the ceramization cycle, and/or in which the above composition is applied, preferably by screen printing, to the glass-ceramic article after ceramization, then said composition is baked.

Advantageously, the glass-ceramic article, in particular the glass-ceramic plate, coated with the enamel according to the invention has an improved tensile strength (in particular compared to conventional enameled plates). The tensile strength is measured using a ring-on-tripod bending test, on an enameled plate test specimen having dimensions of around 70 mm×70 mm (the thickness of the plate moreover generally being around 4 mm), the enameled face being elongated. The test specimen rests on three 9.5-mm diameter balls each positioned at the vertices of an equilateral triangle inscribed in a 40-mm diameter circle. A force is applied by pressing at the center (the load being isotropic in this region) of the test specimen with a 10-mm diameter ring. The rate of advance of the ring is around 5 mm/min. The results are interpreted using the Weibull model described in the following article: "A Statistical Theory of the Strength of Materials", Royal Swedish Institute For Engineering Research, W. Weibull, Stockholm 1939, 1-45. The data obtained revealing the average rupture stress is the data known as the "scale factor", expressed in MPa (this scale factor being, in other words, the result of the processing, by the Weibull method, of flexural modulus of rupture (MOR) measurements).

Thus, the glass-ceramic article, in particular the glass-ceramic plate, coated with the enamel according to the invention advantageously has a scale factor, obtained according to the Weibull model following a bending test, of at least 130 MPa, in particular of at least 140 MPa, in particular of at least 150 MPa, said factor possibly ranging up to 280 MPa at least. This greater tensile strength is particularly advantageous, in particular under extreme transport and storage conditions, some conventional enameled plates being, in comparison, liable to break when a much smaller force is exerted (these plates having, for example, a scale factor of around 70 to 80 MPa, the scale factor of non-enameled plates itself generally being around 150 to 180 MPa). In this regard, it has in particular been possible to establish in the present invention for the article coated with the enamel according to the invention that the crack formed during a shock is oriented parallel to the surface, possibly thus leading to high energy dissipation and better mechanical strength. In particular, when the enamel is baked subsequently as specified below, the glass-ceramic article (such as the plate) obtained, coated with the enamel according to the invention, advantageously has a scale factor, obtained according to the Weibull model following a bending test, much greater than 180 MPa, that is to say not only far above that of conventional enameled plates, but that even significantly exceeds that of bare (non-enameled) glass-ceramic plates, such mechanically reinforced glass-ceramic articles preferably being targeted in the present invention.

The present invention also relates more generally to a process for reinforcing a glass-ceramic article, into which (or comprising a step according to which) a maximum tension is introduced beneath the surface of the glass-ceramic, advantageously in proximity to said surface. In other words, the glass-ceramic is treated so that the stress profile (or distribution of the residual stresses) in the thickness of the glass-ceramic has a maximum tension (or maximum tensile stress value) beneath the surface of the glass-ceramic in proximity to this surface (in particular in the first quarter of the thickness starting from the treated/reinforced surface) in at least one region (in particular the treated region) of the glass-ceramic. The presence of a maximum tension in the stress profile reveals, where appropriate, the presence of flexion in the glass-ceramic (in the case of example 2 and/or the case of the use of an enamel according to the invention baked subsequently as described below, the profile obtained being illustrated in FIG. 3) or this maximum tension may be expressed, where appropriate, by a peak in said profile (in the case of example 1 and/or in the case of the use of an enamel according to the invention baked during the ceramization as described below, the profile obtained being illustrated in FIG. 2). A compression zone beneath the surface (in particular before the maximum tension going toward the surface) is also generally observed, this shallow depth compression zone participating, in particular, in the reinforcement by forcing the cracks, formed where appropriate during a shock, to turn beneath the surface in order to be parallel to the surface, and thus preventing the propagation of these cracks.

The reinforcement obtained by the process according to the invention is at least a relative reinforcement (compared to the same glass-ceramic substrate of the same thickness treated in a customary manner, for example in the case, explained below, of the use of the enamel according to the invention where the glass-ceramics obtained are at least much less embrittled/unembrittled/reinforced compared to glass-ceramics treated with conventional enamels) and is preferably advantageously an absolute reinforcement (compared to the same glass-ceramic of the same thickness, which is bare or untreated).

More particularly in the reinforcement process according to the invention, at least one region of at least one face of the glass-ceramic is reinforced by introducing a maximum tension of at least 1.2 MPa, and preferably of at least 1.5 MPa beneath the surface of the region/face considered and in proximity to the latter. Preferably, the reinforcement is obtained by treating the glass-ceramic so that it has a (maximum) tensile stress of at least 1.2 MPa at a depth of at least 50 μm beneath the/its surface, and preferably of at most 25% of the thickness of the glass-ceramic (for example the thickness of the plate in the case of a glass-ceramic plate) relative to the surface of the glass-ceramic, in the region considered/treated, as mentioned previously. When the article has several faces, the reinforcement may be made on one or more parts or the whole of one or more faces, and advantageously on at least the main part of one face, the reinforcement on a single face (the depth of the maximum tensile stress being determined from this face/surface) generally being sufficient. The thickness stress profile in the glass-ceramic and the maximum tension (tensile stress) are measured using a biasographe as described in the following work: "Photoelasticity of Glass", H. Aben, C. Guillemet, Springer-Verlag Berlin Heidelberg 1993, 126-129. They may also be measured using a polarizing microscope equipped with a Babinet compensator ("Photoelasticity of Glass", H. Aben, C. Guillemet, Springer-Verlag Berlin Heidelberg 1993, 65-66), each optical delay value (δ) given by the equipment (biasographe or polarizing microscope) being converted to a stress value (σ) by using a Brewster constant (C) equal to 2.6 Brewster according to the equation σ=δ/(C×l), l being the width passed through by the light.

The present invention also relates to a glass-ceramic article (in particular a glass-ceramic plate, intended, for example, for covering or accommodating at least one heating element) reinforced, in particular on one face or part/region of one face (or on at least one face or part of one face), characterized in that the glass-ceramic has a (maximum) tensile stress of at least 1.2 MPa, and preferably of at least 1.5 MPa, at a depth, beneath the surface (of said part of face or face), of at least 50 μm (or more specifically the glass-ceramic has a stress profile in the thickness such that it has a (maximum) tensile stress of at least 1.2 MPa at a depth of at least 50 μm) and preferably of at most 25% of the thickness of the glass-ceramic, relative to the surface of the glass-ceramic, in at least said region or face.

Preferably, (especially the case with the use of the enamel according to the invention in particular baked subsequently), the reinforced glass-ceramic article according to the invention, in particular the reinforced glass-ceramic plate, advantageously has (especially for the treated/reinforced region) a scale factor, obtained according to the Weibull model following a bending test, greater than 180 MPa, thus exceeding that of bare glass-ceramic plates, and in addition has a Weibull modulus (revealing the dispersion of the results, the results being even less dispersed when the modulus is large) that is advantageously high (greater than 15). The present invention thus makes it possible to obtain glass-ceramic articles having an improved mechanical strength or to guarantee that a good mechanical strength is retained while reducing, for example, the thickness of the glass-ceramic (the reduction in thickness customarily being accompanied by an embrittlement of the glass-ceramic). In particular, the present invention enables glass-ceramic plates to be obtained that have a thickness of around 3 mm (instead of 4 mm customarily) and that retain a good mechanical strength enabling them, in particular, to be used as a hob.

The present invention also relates to a process for manufacturing (such) a reinforced glass-ceramic article characterized in that it comprises a reinforcing step as described previously.

The introduction of a maximum tension in the glass-ceramic in the reinforcing processes or step described previously may be carried out by a suitable treatment or coating, for example, and according to one advantageous embodiment of the invention, by the use of the enamel according to the invention, preferably baked subsequently, as explained earlier. The reinforcement in the case of the use of such a coating is expressed firstly by no embrittlement or a significantly reduced embrittlement of the glass-ceramic compared to that coated with a conventional coating of the same type (i.e., in the present case, compared to the glass-ceramic coated with a conventional enamel), and where appropriate is also advantageously expressed (the enamel according to the invention having been baked during the ceramization or subsequently, the highest values being obtained in the case of baking subsequently) by an increase in the mechanical strength compared to the bare or untreated glass-ceramic).

The composition of the enamel according to the invention, capable of reinforcing the glass-ceramic and defined above, will now be explained more precisely below. In this composition, the ranges defined for each of the components are paramount for obtaining the desired properties, respect for these ranges making it possible in particular to simultaneously guarantee the production of the frit at high temperature, good coating of the enamel on the substrate, the desired mechanical strength and the chemical resistance, etc.

As indicated above, the composition mentioned preferably comprises less than 2% of alumina $Al_2O_3$, and particularly preferably this composition is alumina-free.

It should be noted that, besides the constituents mentioned above, the composition may, if necessary, contain other constituents (for example, in the form of traces linked to the degree of purity of the raw materials) in a limited amount (less than 5%, generally less than 2%, in particular less than 1%) as long as these constituents do not compromise the desired properties, the composition also advantageously being free of toxic metals such as lead, mercury, cadmium and hexavalent chromium.

It is surprisingly noted that the enamel according to the invention, based on the aforementioned glass frit, has an expansion coefficient (this coefficient being measured more accurately on the glass frit of the enamel, considered to be a glass) of at least $60\times10^{-7}$ $K^{-1}$ (and generally higher, in particular at least $80\times10^{-7}$ or even $100\times10^{-7}$ $K^{-1}$), i.e. much higher than that of the glass-ceramic substrate. To date, it was customary to search for enamels having very low expansion coefficients, close to that of the glass-ceramic substrate, the behavior of the enamel on the substrate being assumed to be proportionally worse when the difference between the expansion coefficients was high.

The enamel chosen according to the invention and the article, in particular the plate, coated with this enamel have good thermal resistance that is compatible with the use of various types of heaters (induction, radiant, halogen, gas, etc. heaters), are scratch and abrasion resistant and resistant to heat shocks, have good aging resistance and offer, where appropriate (in particular when the frit is combined with pigments and/or combined with another layer such as a layer of paint as explained below), an excellent compromise between the opacity commonly desired for enamels and the resistance to the various mechanical stresses to which the coated plates are subjected, the enamel, as desired according to the invention, not affecting, and even improving, the mechanical strength of the plates on which the enamel is deposited, said plates coated with the enamel according to the invention in particular having one or more mechanical strength properties (when the enameled surface is stressed) that are improved (in particular flexural tensile strength and impact resistance) compared to the plates coated with conventional enamels (which in particular break systematically in the impact test), as specified and illustrated below.

Contrary to what might have been feared, any interactions between the glass-ceramic and the layer of enamel according to the invention do not cause any damaging modification or disturbance to the surface of the glass-ceramic. From the process standpoint, the composition deposited does not differ from a conventional enamel and is completely compatible with existing production lines, in particular, it may be applied by screen printing using standard screen printing machines and fabrics. Moreover, as already indicated, it does not have the drawbacks of a conventional enamel (in particular, little or no weakening of the decorated face as already mentioned, etc.). Compared with thin layers deposited by magnetron sputtering, it is more economical and, being electrically insulating, it may be used, with no particular adjustment, with touch-sensitive controls, usually capacitive touch-sensitive controls. It is also compatible with all types of heating (in particular it withstands the high temperatures, of up to 700° C., of the radiant heating elements, and is suitable for the magnetic fields of induction coils, etc.), unlike magnetron-sputtered paints and, where appropriate, layers generally reserved for certain types of heating. It may also be deposited in any region of the plate (including the heater regions), in particular unlike paints.

Besides the glass frit (or glass particles) having the composition explained previously, the enamel according to the invention may also comprise other components. Remember that enamels are generally formed (before application to the substrate and baking) from a powder comprising a glass frit (that has to form the glassy matrix) and pigments (as colorants in particular, these pigments possibly also being part of the frit), the frit and the pigments being based on metal oxides, and from a medium or "carrier" allowing the application and the prior adhesion of the enamel to a substrate.

The enamel according to the invention may thus comprise pigments, the content of pigment(s), added to the frit, in the assembly of frit(s)/pigment(s) of the enamel generally being between 20 and 80% by weight (relative to the assembly of frit(s)/pigment(s)), and preferably between 40 and 60%. The pigments for enamels may be chosen from compounds containing metal oxides such as chromium oxides, copper oxides, iron oxides, cobalt oxides, nickel oxides, zinc oxides, manganese oxides, cerium oxides, titanium oxides, or even based on alumina, etc. or may be chosen from copper chromates, cobalt chromates, etc. They are used as a function of the coloration and/or, where appropriate, the opacity that it is desired to obtain. One example of particularly suitable pigments for adding to the frit according to the invention is in particular a mixture of iron, chromium, cobalt and nickel oxides.

The glass frit and the pigments are conventionally in powder form before being suspended in a medium. The particle size distribution of the assembly of frit(s)/pigment(s) in powder form is generally chosen so that at least 90% by weight of the particles forming the powder have a diameter of less than 20 µm, in particular less than 10 µm.

The frit of the composition according to the invention is conventionally obtained by melting, at high temperature (more than 1000° C.) a mixture of suitable (natural or synthetic) raw materials. The frit is then milled (generally in a solvent, such as ethanol, that is then evaporated) in powder form, and if necessary pigments and/or opacifiers are added. The pulverulent mixture (glass powder+pigments and/or opacifiers) that results (after evaporation if necessary of the milling solvent) is subsequently suspended in a medium in order to obtain a composition (paste) capable of being deposited onto a substrate.

The composition of enamel according to the invention, in its ready-to-deposit form, thus generally also comprises a medium allowing adjustment to the viscosity desired for application to the substrate and enabling binding with the substrate. This medium, chosen in order to ensure good suspension of the particles of frits and pigments and that must be consumed at the latest during the baking of the enamel, may be any medium or organic binder customarily used in the conventional enamel compositions and may in particular comprise solvents, diluents, oils such as pine oil and other plant oils, resins such as acrylic resins, petroleum fractions, film-forming substances such as cellulose substances, etc. The proportion of medium in the ready-to-deposit composition is preferably between 40 and 60% by weight of said composition, preferably between 45 and 55% by weight.

The enamel composition before deposition onto an article, such as a plate, is therefore generally in the form of a stable liquid-solid mixture, of pasty consistency, with a viscosity suitable for the deposition process (in particular by screen printing).

The layer of enamel deposited on the article or substrate, in particular the plate, according to the invention generally covers at least one part of one face of the article (in particular of the plate), in particular the entire region liable to be exposed to stresses (shock or other stresses) during use (for example at least the edges or even the main part of the face in the case of a plate, the region coated being the reinforced region), and may cover the whole of said face (with the exception, where appropriate, of regions and/or of resists, intended for example for the reading of displays). The thickness of one layer of enamel after baking (whether the baking is carried out during the ceramization after deposition in the precursor glass, or is carried out subsequently after deposition on the glass-ceramic, as explained below) is from 1 to 10 µm, generally from 2.5 to 5 µm. In the case in particular of a plate, the layer defined according to the invention may be deposited on the lower or upper face of the plate and is preferably deposited on the lower face.

Advantageously, the enamel may be deposited as one or more layers and/or be combined, where appropriate, with other layers. In particular, the enamel according to the invention may be used in several layers and/or may act as an underlayer to another layer, such as a layer of enamel (in particular of a different nature) or of paint, making it possible in particular depending on the case to increase the thicknesses and/or to juxtapose two types of decoration and/or to procure a greater opacity, etc. One embodiment of the invention thus relates to a two-layer enameled article, in particular a plate, that is to say one having, as a coating, at least two layers or passes of enamel, including at least a first (that is to say deposited first) layer or pass of the enamel according to the invention, the enamels of each layer or pass possibly being identical or possibly being based on one and the same frit or different, for example possibly being of a different color, one of the layers or passes forming for example a base frame and the other forming a decoration or specific graphics. Preferably, each novel enamel added, where appropriate, over a previously deposited enamel has a softening point below that of the previously deposited enamel.

Preferably, the enamel may be used with at least one layer of opacifying paint. The layer(s) of paint combined, where appropriate, with the enamel according to the invention are advantageously chosen so as to withstand high temperatures and to be stable with respect to their color and their cohesion with the plate, and so as not to affect the mechanical properties of the plate. They advantageously have a decomposition temperature above 350° C., are generally based on one or more resins (such as a silicone resin, in particular one modified by the incorporation of at least one alkyd resin, or a polyimide, polyamide, polyfluorinated and/or polysiloxane resin, such as the following resins: Dow Corning® 804, 805, 806, 808, 840, 249, 409 HS and 418 HS, Rhodorsil® 6405 and 6406 from Rhodia, Triplus® from General Electric Silicone and SILRES® 604 from Wacker Chemie GmbH, etc.), and, where appropriate, they are filled (for example with one or more pigments or colorants) and optionally diluted so as to adjust their viscosity, the diluent being, where appropriate, removed during their subsequent baking. The thickness of each paint layer may be between 1 and 100 microns (especially between 5 and 50 microns) and it may be applied by any suitable technique, such as brush deposition, doctor blade deposition, spraying, electrostatic deposition, dip coating, curtain coating, screen printing, etc. Generally, according to the invention, it is deposited by screen printing, where appropriate followed by drying.

Advantageously, the substrate, in particular the glass-ceramic plate, coated with the enamel (obtained after baking) according to the invention (the enamel if need be comprising pigments and/or being combined with a layer of paint, for example) has an opacity such that it makes it possible in particular to mask underlying elements. The opacity is evaluated in the context of the present invention by measuring (colorimetry in reflection carried out using a Byk-Gardner Color Guide 45/0 colorimeter) the color variation $\Delta E^*$, corresponding to the difference between the color measured on the face of the substrate opposite the face bearing the enamel, for the substrate placed on an opaque white background and that for the substrate placed on an opaque black background ($\Delta E^* = ((L_B^* - L_N^*)^2 + (a_B^* - a_N^*)^2 + (b_B^* - b_N^*)^2)^{1/2}$ according to the equation established in 1976 by the CIE, $L_B^*, a_B^*, b_B^*$ being the colorimetric coordinates of the first measurement on a white background and $L_N^*, a_N^*, b_N^*$ being those of the second measurement on a black background). Advantageously, the glass-ceramic substrate coated with the enamel according to the invention has a $\Delta E^*$ value less than or equal to 0.5, preferably less than or equal to 0.4.

As already mentioned, the present invention also relates to the processes for manufacturing articles, in particular plates, according to the invention, and advantageously articles reinforced as mentioned previously, in which (when the enamel according to the invention is used) the preceding composition is applied, preferably by screen printing, to the article of precursor glass (or mother glass or green glass) before ceramization, said composition being baked during the ceramization cycle and/or in which the preceding composition is applied, preferably by screen printing, to the glass-ceramic article after ceramization, then said composition is baked.

Preferably when the baking of the enamel is carried out subsequently (after ceramization, this procedure also being known as a process with rebaking), said baking is carried out at a temperature that makes it possible to develop crystals in the enamel (generally while modifying the interface so that the cracks propagate in and/or beneath the interface between the glass-ceramic and the enamel parallel to the surface as indicated previously, the cracks formed in the enamel propagating and indeed turning after having traveled a few micrometers in and/or beneath the interface so as to finally be parallel to the surface). This temperature is chosen from the temperature range within which good coverage with the enamel and the formation of crystals are in particular observed, this temperature range generally lying between 700 and 900° C. for the enamels according to the invention. Generally and preferably, this temperature is around 250° C. to 300° C. higher with respect to the dilatometric softening temperature of the enamel (or more precisely of the glass/of the glass frit forming the enamel), and preferably corresponds to (or is located just at or inside) the exothermic crystallization peak of the enamel. The enamel covering the substrate according to the invention is thus, where appropriate, crystallized after baking.

As a reminder, the manufacture of glass-ceramic plates generally takes place as follows: the glass, having a composition chosen for forming the glass-ceramic, is melted in a melting furnace, the molten glass is then rolled into a standard ribbon or sheet, by making the molten glass pass between rolling rolls, and the glass ribbon is cut to the desired dimensions. The plates thus cut are then ceramized in a manner known per se, the ceramization consisting in firing the plates with the thermal profile chosen to convert the glass into the polycrystalline material called "glass-ceramic", the expansion coefficient of which is zero or almost zero and which is resistant to a heat shock possibly ranging up to 700° C. The ceramization generally comprises a step of progressively raising the temperature up to the nucleation range, generally located in proximity to the glass conversion range, a step of passing through the nucleation range over several minutes, a further progressive rise in the temperature up to the ceramization hold temperature, the ceramization hold temperature being maintained for several minutes, followed by rapid cooling down to room temperature. Where appropriate, the process also includes a cutting operation (generally before ceramization), for example using a water jet, mechanical scoring using a scoring wheel, etc., followed by a fashioning operation (grinding, beveling, etc.).

In the process according to the invention, the composition described previously is deposited, either onto the glass precursor article or onto the glass-ceramic article obtained after ceramization, in the form of a paste, preferably by screen printing, the thickness of the wet film being, for example, around a few microns (in particular less than or equal to 20 µm, and generally less than or equal to 10 µm). After depositing the composition, the coated article is generally dried (for example, via infrared heating or in an oven), generally at temperatures around 100-150° C., so as to evaporate the solvent (medium), fix the coating and allow the article to be handled, which results in a dry coating, then depending on the case, undergoes a conventional high-temperature ceramization cycle (especially as mentioned previously), the baking of the layer accompanying the conversion of the substrate, or undergoes a (re)baking at a temperature preferably located in the crystallization zone as explained previously, the baking times being adapted as a function of the chosen temperature (for example, longer if the temperature chosen is lower), the coating obtained then having a thickness generally around a few microns (generally between 1 and 10 µm, in particular between 2 and 5 µm). The process with (re)baking is generally preferred as it makes it possible to adapt the baking temperature in a more suitable manner as explained previously and it makes it possible to obtain a greater reinforcement of the glass-ceramic products.

In one embodiment, the article according to the invention may be based on a glass-ceramic of black appearance, having a low light transmission of less than 5% (such as the plates sold under the name Kerablack by Eurokera) coated with the layer of enamel according to the invention. Preferably however, it is an article, in particular a plate, of a generally light color, based on a transparent (such as the plates sold under the name KeraLite by Eurokera and Keraglass) or a translucent glass-ceramic (such as the plates sold under the name Kerawhite, Kerabiscuit or Keravanilla by Eurokera), coated with the layer of enamel according to the invention, said layer possibly being of decorative and/or functional use (for example, possible being intended for masking, at least partly, the underlying elements when they are not in use, such as heating elements and possible displays, while still allowing the heating elements and possible displays to be detected when they are in use).

It should be noted that, depending on the number of additional layers relative to the enamel layer according to the invention, they may be deposited in succession before and/or after (i.e. in line with or subsequently to) ceramization, each deposition being generally followed by a heat treatment. It should also be noted that the layer according to the invention may if required be deposited by a method other than screen printing.

When the article according to the invention is a plate, said plate may, where appropriate, comprise reliefs and/or hollows and/or it may be provided (or associated) with one or more additional functional or decorative elements (frame, connector(s), cable(s), control element(s), display(s), for example what are called "7-segment" light-emitting diode displays or liquid crystal displays, electronic control panel with touch-sensitive controls and digital display, etc.). The plate according to the invention may where appropriate be mounted on an insulating support, inside which the one or more heating elements are placed, without an intermediate complex with the aim of masking the interior of the apparatus from the user's view.

The invention also relates to the high-temperature-maintaining and/or cooking appliances (or devices) that include at least one substrate (plate or door) according to the invention (for example cookers, built-in cooktops, ovens, etc.). The invention covers both cooking appliances having a single plate and appliances having several plates, each of these plates having, where appropriate, a single heater or multiple heaters. The term "heater" is understood to mean a cooking location. The invention also relates to hybrid cooking appliances, the hob(s) of which has (have) several types of heater. Furthermore, the invention is not limited to the manufacture of hobs for cookers or cooktops. The plates manufactured according to the invention may, as described above, also be other plates (chimney inserts, fire screens, etc.) that have to be very insensitive to temperature variations.

The following examples illustrate the present invention without however limiting the scope thereof.

A glass-ceramic plate having two smooth faces was manufactured from a glass having a composition according to patent application FR 2 657 079, this in particular comprising, as weight percentages, the following oxides:

| | |
|---|---|
| $SiO_2$ | 69.05 |
| $Al_2O_3$ | 18.90 |
| $Li_2O$ | 3.3 |
| MgO | 0.9 |
| ZnO | 1.55 |
| BaO | 0.75 |
| $K_2O$ | 0.1 |
| $TiO_2$ | 2.6 |
| $ZrO_2$ | 1.75 |
| $As_2O_3$ | 0.9 |
| $Na_2O$ | 0.2 |

This glass was melted at around 1600-1750° C. in an amount such that a glass ribbon was able to be rolled, from which ribbon glass plates with final dimensions of 56.5 cm×56.5 cm×0.4 cm were cut.

The plates were coated by screen printing on their upper face with a composition, in the form of a screen-printable stable enamel (based on a powder having the composition specified in each of the examples, the powder being made into a paste in a medium based on acrylic resin and on pine oil sold under the reference MX54 by Ferro for the purpose of depositing it onto the plate, and said is medium being consumed at the latest during the baking of the enamel) using conventional polyester or polyamide fabrics, either before ceramization, or after ceramization as stated subsequently depending on the examples, then dried at around 100-150° C.

The plates (before or after coating with the enamel according to the examples) were ceramized on ceramic trays according to a cycle as described in patent application FR 2 657 079. When the plates were coated with the enamel after ceramization, they also underwent a baking operation after the deposition and drying of the enamel, as stated according to the examples.

Figure 2:
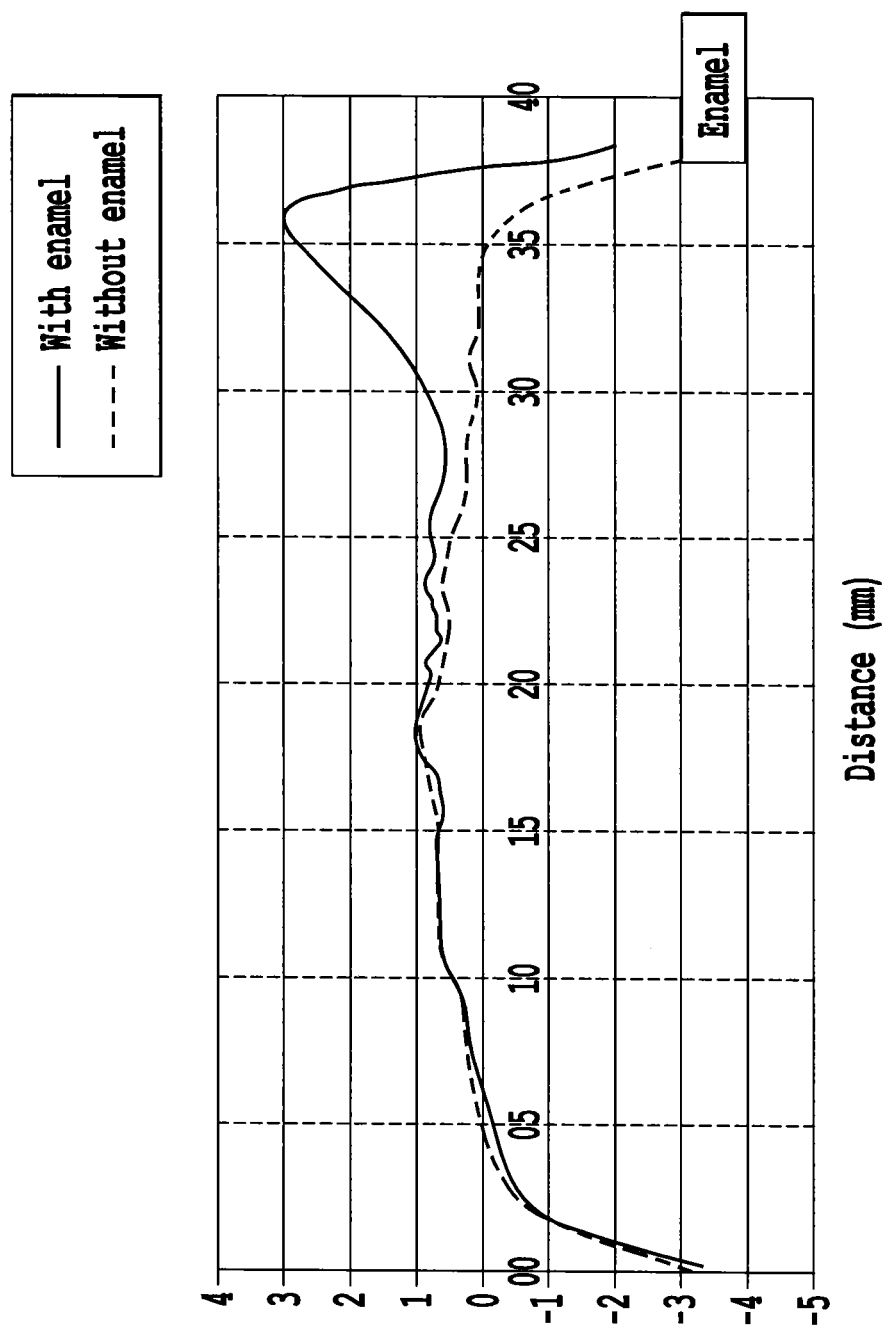
FIG. 2: The thickness stress profile in the glass-ceramic of example 1, which includes the case of the bare (uncoated) glass-ceramic plates.

Glass-ceramic plates coated with a layer of enamel were obtained. These plates were cut to form 70 mm×70 mm test specimens, which were analyzed in terms of mechanical strength by measuring their scale factor (expressed in MPa) and also their Weibull modulus by means of a ring-on-tripod bending test, the results being interpreted using the Weibull model, as described previously in the present text, the decorated surface being in extension. The thickness stress profile in the glass-ceramic was also measured in certain examples using a biasographe as described in the following work: "Photoelasticity of Glass", H. Aben, C. Guillemet, Springer-Verlag Berlin Heidelberg 1993, 126-129, mentioned above, these profiles appearing in FIGS. 1, 2 and 3, these figures respectively illustrating the stress profiles in the thickness for the following examples: reference example 3, example 1 and example 2; FIGS. 1 and 2 also illustrating the thickness stress profile in the case of the bare (uncoated) glass-ceramic plates used.

Reference Example 1

In the first reference example, the enamel used was a standard enamel based on a powder comprising 70% by weight of a glass frit having the following composition: $SiO_2$: 41.7%; $Na_2O$: 0.9%; $K_2O$: 3.5%; $Li_2O$: 2.1%; CaO: 2.8%; $Al_2O_3$: 18.5%; $ZrO_2$: 2.4%; $B_2O_3$: 28%, said powder also comprising 30% by weight of $TiO_2$ as pigment. The enamel (more specifically the glass frit forming said enamel) according to the present example had an expansion coefficient of the order of $52\times10^{-7}$ $K^{-1}$, and said enamel (or rather the glass frit forming said enamel) also had a dilatometric softening temperature of the order of 590° C. In this reference example, the enamel was deposited on the plate (of precursor glass or green glass or mother glass) before ceramization and baked during the ceramization, the thickness of the enamel layer after baking being around 3 μm.

The scale factor obtained (according to the Weibull model, after a bending test) was around 52 MPa, the Weibull modulus being equal to 13.

Reference Example 2

In the second reference example, the enamel used was a standard enamel based on a powder comprising 100% by weight of the glass frit described in reference example 1 (the expansion coefficient and the dilatometric softening temperature of the enamel being of the same order as in reference example 1). In this second example, the enamel was deposited on the already ceramized plate, the assembly being (re)baked at 800° C. for 30 minutes, the thickness of the enamel layer after baking being around 3 μm.

The scale factor obtained was around 80 MPa, the Weibull modulus being equal to 54.

Reference Example 3

In this third reference example, the enamel used was a standard enamel based on a powder comprising 100% by weight of a glass frit having the following composition: $SiO_2$: 48.6%; MgO: 3.8%; $Na_2O$: 2.6%; $K_2O$: 3.3%; $Li_2O$: 1.3%; CaO: 0.6%; BaO: 17.8%; $Al_2O_3$: 7.1%; $ZrO_2$: 1.7%; ZnO: 8%; $B_2O_3$: 5.4%. The enamel according to the present example had an expansion coefficient of the order of $75\times10^{-7}$ $K^{-1}$ and a dilatometric softening temperature of the order of 600° C. In this third example, the enamel was deposited on the plate (green glass or mother glass) before ceramization and baked during the ceramization, the thickness of the enamel layer after baking being around 3 μm.

The scale factor obtained was around 88 MPa, the Weibull modulus being equal to 27. The thickness stress profile in the glass-ceramic is given in FIG. 1, in which the presence of a maximum tension in proximity to the enameled surface is not observed, the maximum stress value being around 0.9 MPa. In comparison, the stress profile of an uncoated plate is represented, this profile also not having a maximum tension in proximity to the enameled surface, such a plate having a scale factor of around 170 MPa.

Example 1

In this first example according to the invention, the enamel used was an enamel based on a powder comprising 100% by weight of a glass frit having the following composition: $SiO_2$: 60.5%; MgO: 4%; $Na_2O$: 9.5%; $Li_2O$: 5%; BaO: 10%; $ZrO_2$: 2%; ZnO: 4%; $B_2O_3$: 5%. The enamel according to the present example had an expansion coefficient of the order of $100\times10^{-7}$ $K^{-1}$ and a dilatometric softening temperature of the order of 523° C. In this first example, the enamel was deposited on the plate (green glass or mother glass) before ceramization and baked during the ceramization, the thickness of the enamel layer after baking being of the order of 3 μm.

The scale factor obtained was around 180 MPa, the Weibull modulus being equal to 27. The thickness stress profile in the glass-ceramic is given in FIG. 2, in which the presence of a peak is observed that has a maximum tensile stress of 3.0 MPa at a depth (measured perpendicular to the surface) of 0.45 mm beneath the surface (starting from the enameled side/side reinforced by the enamel). In comparison, the stress profile of an uncoated plate is represented, this profile not having a maximum tension in proximity to the enameled surface, as already indicated in reference example 3.

Example 2

In this second example according to the invention, the enamel used was the same enamel as in the preceding example 1 according to the invention, the enamel this time being deposited on the already ceramized plate, the assembly being (re)baked at 770° C. for 30 minutes, the thickness of the enamel layer after baking being around 3 μm.

The scale factor obtained was around 207 MPa, the Weibull modulus being equal to 19.

Figure 3:
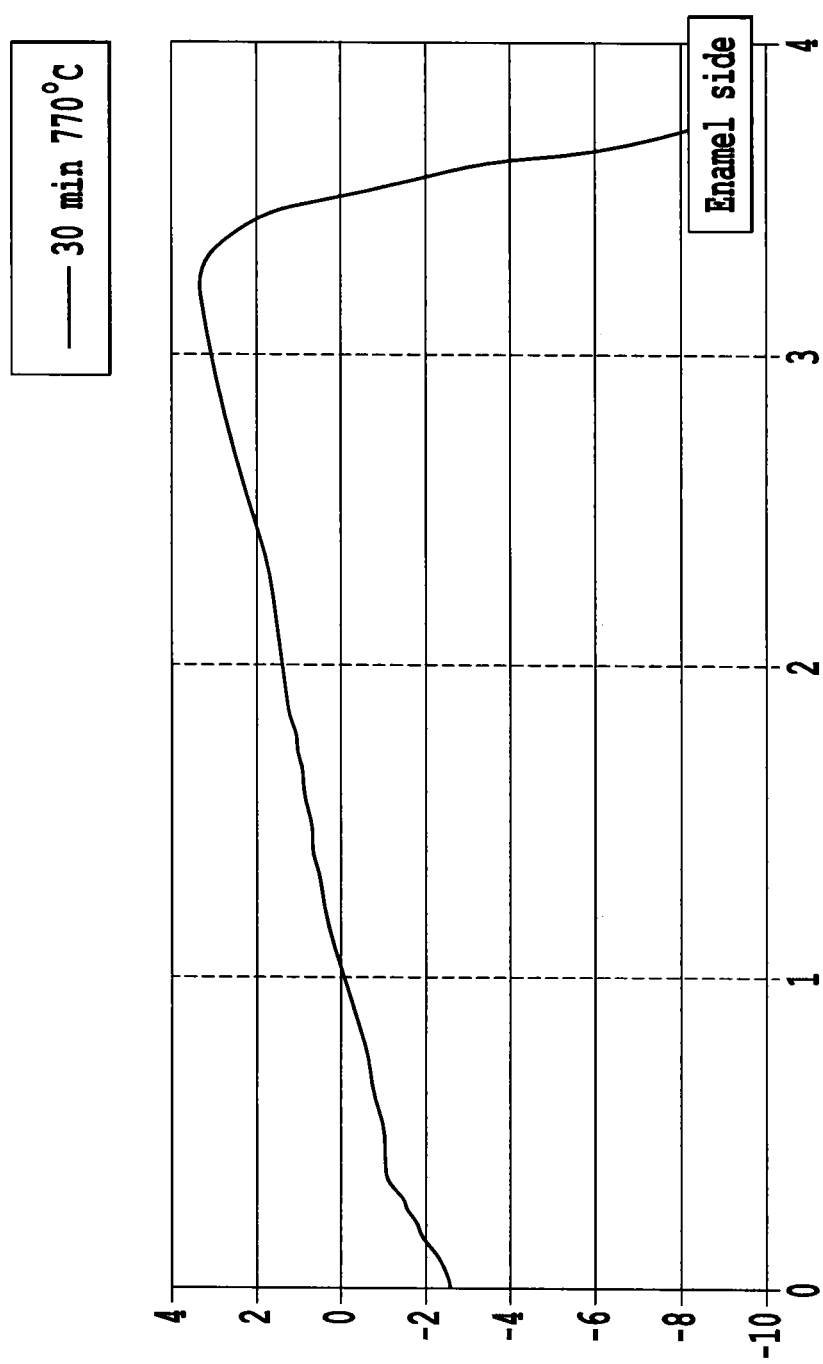
FIG. 3: The thickness stress profile in the glass-ceramic of example 2.

The thickness stress profile in the glass-ceramic is given in FIG. 3, in which the presence of a maximum tension and of a flexion is observed, with a maximum tensile stress of 3.1 MPa at a depth of 0.7 mm beneath the surface (starting from the enameled side/side reinforced by the enamel).

Example 3

In this third example according to the invention, the enamel used was based on a powder comprising 45% by weight of the glass frit described in the preceding example 2 according to the invention, said powder also comprising 55% by weight of black pigments in the form of a mixture of iron, chromium, cobalt and nickel oxides, (the expansion coefficient and the dilatometric softening temperature of the enamel being of the same order as in example 1 according to the invention). The enamel was deposited on the already ceramized plate and baked as in example 2 according to the invention, the thickness of the enamel layer after baking being around 6.75 μm.

The scale factor obtained was around 238 MPa, the Weibull modulus being equal to 20, and the color variation ΔE* of the enameled plate obtained was around 0.04. A maximum tensile stress of 2.0 MPa was observed at a depth of 0.64 mm beneath the surface (starting from the enameled side/side reinforced by the enamel).

Example 4

In this fourth example according to the invention, the enamel used was an enamel based on a powder comprising 100% by weight of a glass frit having the following composition: $SiO_2$: 63%; MgO: 4%; $Na_2O$: 9.5%; $Li_2O$: 2.5%; BaO: 10%; $ZrO_2$: 2%; ZnO: 4%; $B_2O_3$: 5%. The enamel according to the present example had an expansion coefficient of the order of $87\times10^{-7}$ $K^{-1}$ and a dilatometric softening temperature of the order of 549° C. In this fourth example, the enamel was deposited on the already ceramized plate, the assembly being (re)baked at 800° C. for 30 minutes, the thickness of the enamel layer after baking being around 4 μm.

The scale factor obtained was around 262 MPa, the Weibull modulus being equal to 16.

The plates according to the invention may especially be used advantageously to produce a new range of hobs for cookers or cooktops, or for producing elements of a wall or walls (for example doors) for ovens, or for producing chimney inserts or fire screens, etc.

The invention claimed is:

1. A reinforced glass-ceramic article, reinforced over at least one region of at least one face, wherein the glass-ceramic has a tensile stress of at least 1.2 MPa at a depth of at least 50 μm, beneath its surface, in at least said region or face.

2. The reinforced glass-ceramic article of claim 1, wherein the article is at least partly coated with at least one layer of an enamel formed from a glass frit comprising, as weight percentages:

| | |
|---|---|
| $SiO_2$ | 50-66%; |
| MgO | 3-8%; |
| $Na_2O$ | 7-15%; |
| $K_2O$ | 0-3%; |
| $Li_2O$ | 0-12%; |
| CaO | 0-10%; |
| BaO | 0-15%; |
| $Al_2O_3$ | 0-3%; |
| $ZrO_2$ | 0-3%; |
| ZnO | 0-5%; and |
| $B_2O_3$ | 0-8%; | wherein the sum of the alkaline-earth metal oxides, CaO+BaO, is between 8 and 15%, and the sum of the alkali metal oxides, $Na_2O+K_2O+Li_2O$, is between 7 and 20%.

3. The reinforced glass-ceramic article of claim 2, wherein the glass frit comprises less than 2% of alumina $Al_2O_3$.

4. The reinforced glass-ceramic article of claim 1, wherein the article is at least partly coated with a layer of opacifying paint, an enamel, or a mixture thereof.

5. The reinforced glass-ceramic article of claim 1, having a scale factor, obtained according to the Weibull model, after a bending test, of at least 130 MPa.

6. The reinforced glass-ceramic article of claim 1, wherein the article is at least partly coated with at least one layer of a crystalline enamel.

7. The reinforced glass-ceramic article of claim 1, wherein a crack formed during a shock is oriented parallel to the surface.

8. The reinforced glass-ceramic article of claim 1, which is a 3-mm thick glass-ceramic plate.

9. A device for baking or for maintaining at high temperature, comprising a reinforced glass-ceramic article of claim 1 and at least one heating element.

10. A process for reinforcing a glass-ceramic article, the process comprising:

introducing a maximum tension beneath a surface of a glass-ceramic in proximity to said surface, wherein introducing comprises treating the glass-ceramic so as to have a tensile stress of at least 1.2 MPa at a depth of at least 50 μM beneath the glass-ceramic surface.

11. The process of claim 10, wherein introducing comprises treating the glass-ceramic so as to have a tensile stress of at least 1.2 MPa at a depth of at least 50 μm, and at most 25% of the thickness of the glass-ceramic relative to the surface of the glass-ceramic, in at least one region of the glass-ceramic.

12. A process for manufacturing a reinforced glass-ceramic article, comprising the reinforcing of claim 10.

13. The process of claim 12, wherein the introducing of a maximum tension in the glass-ceramic is carried out using an enamel composition formed from a glass frit comprising, as weight percentages:

| | |
|---|---|
| $SiO_2$ | 50-66%; |
| MgO | 3-8%; |
| $Na_2O$ | 7-15%; |
| $K_2O$ | 0-3%; |
| $Li_2O$ | 0-12%; |
| CaO | 0-10%; |
| BaO | 0-15%; |
| $Al_2O_3$ | 0-3%; |
| $ZrO_2$ | 0-3%; |
| ZnO | 0-5%; and |
| $B_2O_3$ | 0-8%; | wherein the sum of the alkaline-earth metal oxides, CaO+BaO, is between 8 and 15%, and the sum of the alkali metal oxides, $Na_2O+K_2O+Li_2O$, is between 7 and 20%.

14. The process of claim 13, comprising applying the enamel composition to a precursor glass article before ceramization, and baking said composition during a ceramization cycle and/or applying said composition to the glass-ceramic article after ceramization, and baking said composition.

15. The process of claim 14, wherein the baking of the enamel after ceramization is carried out at a temperature located in the crystallization zone and/or at a temperature of the order of 250° C. to 300° C. higher with respect to the dilatometric softening temperature of the enamel.

* * * * *